United States Patent Office 2,795,499
Patented June 11, 1957

2,795,499
PRODUCTION OF METALS

David Peterson, Ames, Iowa, assignor to the United States of America as represented by the United States Atomic Energy Commission No Drawing. Application January 9, 1945, Serial No. 572,089

9 Claims. (Cl. 75—84.1)

My invention relates to the production and treatment of uranium and particularly to methods of making and using crucible linings in the production of uranium in massive form.

In the production of uranium, it has been proposed to reduce a finely divided halide of uranium such as uranium tetrafluoride, $UF_4$, to uranium metal by reacting the fluoride with a powdered metallic reducing agent such as magnesium or calcium metal, in a closed iron crucible or bomb by externally heating the bomb containing these materials as reactants until, by an exothermic reaction the fluoride is reduced to the metal. Sufficient heat is added or is developed during the reaction to maintain the uranium and the reaction mixture in molten state until the metal separates from other reaction products by gravity, and collects in the lower portion of the bomb or other vessel. Some difficulty has been experienced in providing suitable inert refractory linings for the iron crucible or bomb in which the process is carried out. Calcined calcium oxide or dolomite have proved to be among the best lining materials, such linings being compacted by mechanically jolting the crucible during the formation of the lining in order to cause the particles of lining material to agglomerate to form a more dense lining.

One object of my invention is to provide an improved refractory lining for crucibles or reaction vessels which are suitable for use in the production of uranium.

A second object of my invention is to provide a uranium metal by reduction of uranium tetrafluoride by methods which permit production of a higher percentage of usable uranium than previous methods.

In accordance with the present invention it has been found that superior refractory linings for crucible or bombs and the like may be secured by incorporation in the lining of a substantial quantity of an alkaline earth metal such as metallic magnesium, calcium, barium or strontium. Such linings have been found to be particularly valuable when used in conjunction with the production of metallic uranium by reduction of a uranium halide such as uranium tetrafluoride with a reducing metal such as magnesium or calcium or other alkaline earth metal. It has been found that yields of metallic uranium may be increased by 5 percent or even more by use of a crucible or bomb lined in accordance with this invention. Moreover, the bomb linings exhibit less tendency to fail during use.

The magnesium or other metal incorporated in the lining preferably is distributed more or less uniformly throughout the liner or at least the exposed surface thereof. Finely divided metal having a particle size of minus 50 to 100 mesh or smaller is used. The amount of metal used is capable of considerable variation so long as sufficient metal is present to secure the desired result. However, excessive amounts are undesirable since the refractory character of the lining may be decreased undesirably. In general a refractory containing from about 1 to 6 percent by weight of the metal is found suitable.

The invention may be more fully understood by the following example which illustrates the general manner of operation as herein contemplated.

A quantity of calcined calcium oxide is mixed with from 1 to 6 percent by weight of finely divided magnesium having a particle size of minus 50 mesh. A small quantity of the lining mixture of calcium oxide and magnesium is then placed in the bottom of an iron crucible and compacted by jolting on a jolting table. A core of wood or metal is positioned centrally in the crucible and enough lining mixture added to form the side walls of the crucible usually about one inch in thickness. Further jolting compacts the lining into a dense, sturdy, mass that is self-supporting without the use of binders.

The charge comprises an intimate mixture of powdered metallic calcium or magnesium or the like and uranium tetrafluoride, preferably with a slight excess of calcium or magnesium, such as 10 percent over the stoichiometric combining properties. The charging materials in a quantity sufficient for one charge are tumbled in a rotary mixer to provide a more or less uniform fluffy mixture. The reactants are then placed in the lined crucible while still in a fluffy state and without compacting. The reactants are then covered with additional lining mixture, which is packed by light tamping only, so that the charge will not be compacted, as such compacting may cause a non-uniform reaction. A cap member is clamped on the top of the crucible but not sealed so that gases or volatile materials may escape from the crucible. The charged crucible is now ready for the reaction.

The closed crucible is placed in a furnace and the reaction is initiated. Where magnesium is used the mixture is heated to a temperature of approximately 500 to 600° C. whereupon the exothermic reaction is initiated within the crucible. This exothermic reaction releases sufficient heat to raise the temperature above the melting point of uranium to complete the reaction and maintain the temperature above this level without further heating from an external source, until the uranium separates in the form of a molten pool. Following the reaction, metal may be withdrawn in molten state or allowed to solidify and the solid uranium metal body recovered.

The principle reaction between the reaction constituents may be represented by the following equation:

$$UF_4 - 2Mg = 2MgF_2 - U$$

Where calcium is used a greater amount of heat is evolved and therefore it is generally unnecessary to heat the mixture. In such a case the reaction may be initiated by heating a portion of the mixture locally such as by an electrically heated fuse wire. Otherwise the reaction takes place in a similar manner.

The use of magnesium or calcium metal and the like results in the recovery of substantially increased yields, frequently 5 percent or more, of uranium. The exact function of the magnesium or other metal is uncertain and the advantageous results secured may be due to a number of factors. For example the presence of alkaline earth metal in the lining serves to minimize the adverse effect of water or moisture which may be present. Water is an objectionable contaminant in the reaction herein contemplated since it reacts with the uranium halide forming a regenerative cycle represented by the following equation:

$$2H_2O - UF_4 = UO_2 - 4HF$$

$$4HF - 2CaO = 2CaF - H_2O$$

On the other hand when magnesium and similar metals are present in the lining this reaction may be minimized since the magnesium or its equivalent may react in accordance with one or both of the following equations:

$$Mg - H_2O = MgO - H_2$$

$$Mg - 2HF = MgF_2 - H_2$$

so that the magnesium and any water from the magnesium oxide form a stable compound and release hydrogen, the latter to pass off as a gas.

If a small amount of the water should react with the uranium tetrafluoride, the hydrogen fluoride formed will react with the magnesium forming magnesium fluoride and releasing hydrogen, thereby eliminating the water from the system.

The advantages accrued from the presence of these metals in the lining may also be attributed to other factors. For example the magnesium in the lining may serve to react with the adjacent $UF_4$ or similar halide thereby promoting a surface reaction at the interface between the periphery of the charge and the lining periphery. It has been observed that in addition to increasing the yield of uranium, the use of metallic magnesium or similar metal in the liner decreases the reaction time of the operation by as much as 20 percent or more.

Whatever the function of the magnesium applicant does not wish to confine himself to any theory of operation and the above explanation is submitted merely as a partial analysis of possible function of the metals used.

While I have particularly described the invention with respect to the use of magnesium in the liner, other materials that will form non-reactive oxides and which are above hydrogen in the electromotive series and are capable of reacting with water to liberate hydrogen may be used in its stead. For example, calcium has proved satisfactory and the other alkaline earth metals, such as beryllium, strontium and barium may also be used. Moreover alkali metals such as sodium or potassium or lithium or other metals such as radium are suitable in many cases. Furthermore the invention may be applied to use in connection with various refractories such as dolomite (CaOMgO), magnesium oxide titanium dioxide or other refractory oxides or silicates.

While the process is particularly applicable to the production of uranium by reaction of $UF_4$ with an alkaline earth metal such as magnesium, calcium, barium or strontium it may also be applied to the reduction of other uranium halides such as $UCl_4$, $UBr_4$, $K_2UF_6$, $KUF_5$ etc. Moreover the refractory lining may be used in other processes.

It will be appreciated that changes and modifications of my invention will be apparent to those skilled in the art, and that the invention is not limited to the particular example described nor to the other features and modifications thereof set forth except as required by the appended claims.

I claim:

1. A process for producing uranium metal comprising heating a uranium halide at an elevated temperature in contact with an alkaline earth metal and a refractory composition comprising essentially a uniform mixture of a refractory metal oxide and a free metal from group IIA of the periodic system.

2. A process for producing uranium metal comprising heating a uranium halide at an elevated temperature in contact with an alkaline earth metal and in contact with a refractory composition comprising essentially a uniform mixture of a refractory metal oxide and a free metal which is above hydrogen in the electromotive series.

3. In the process of producing uranium metal the step comprising reacting uranium tetrafluoride at a temperature above the melting point of uranium metal with an alkaline earth metal said reaction mixture being in contact with a composition comprising a refractory oxide containing a metal of group IIA of the periodic system uniformly dispersed therein.

4. A process for producing uranium metal comprising heating a uranium halide at an elevated temperature in contact with an alkaline earth metal and in contact with a refractory composition comprising essentially a uniform mixture of a refractory metal oxide and from 1 to 6% by weight of a free metal above hydrogen in the electromotive series.

5. A process for producing uranium metal comprising heating a uranium halide at an elevated temperature in contact with an alkaline earth metal and in contact with a refractory composition comprising essentially a uniform mixture of a refractory metal oxide and from 1 to 6% by weight of a free metal of group IIA of the periodic system.

6. A process for producing uranium metal comprising heating a uranium halide at an elevated temperature in contact with an alkaline earth metal and a refractory composition comprising essentially a uniform mixture of a refractory metal oxide and free calcium metal.

7. A process for producing uranium metal comprising heating a uranium halide at an elevated temperature in contact with an alkaline earth metal and a refractory composition comprising essentially a uniform mixture of a refractory metal oxide and free magnesium metal.

8. A process for producing uranium metal comprising heating a uranium halide at an elevated temperature in contact with an alkaline earth metal and a refractory composition comprising essentially a uniform mixture of a refractory metal oxide and from 1 to 6% by weight free magnesium metal.

9. A process for producing uranium metal comprising heating a uranium halide at an elevated temperature in contact with an alkaline earth metal and a refractory composition comprising essentially a uniform mixture of a refractory metal oxide and from 1 to 6% by weight free calcium metal.

References Cited in the file of this patent

UNITED STATES PATENTS 1,728,940    Marden _____ Sept. 24, 1929

OTHER REFERENCES

Mellor: Comprehensive Treatise on Inorganic and Theoretical Chemistry, vol. 3, pp. 637 and 644 (1923); vol. 4, p. 266 (1923). Published by Longmans, Green and Co., London.